United States Patent [19]
Smith

[11] 3,776,435
[45] Dec. 4, 1973

[54] PALLET
[75] Inventor: William R. Smith, Cincinnati, Ohio
[73] Assignee: Cincinnati Milacron Inc.,
Cincinnati, Ohio
[22] Filed: July 14, 1972
[21] Appl. No.: 271,719

[52] U.S. Cl.............. 222/566, 108/53, 220/97 C, 222/143
[51] Int. Cl............................................ B65d 25/48
[58] Field of Search................ 222/460, 566, 143; 214/305; 229/17 B, 17 SC, 23 C, 14 B; 220/97 C; 108/51–58

[56]         References Cited
          UNITED STATES PATENTS
| | | | |
|---|---|---|---|
| 2,622,771 | 12/1952 | Tulou | 222/143 X |
| 3,602,400 | 8/1971 | Cooke | 222/460 X |
| 3,707,127 | 12/1972 | Palfey | 108/53 |
| 3,255,927 | 6/1966 | Rupert, Jr. et al | 222/143 |
| 3,460,718 | 8/1969 | Plant | 222/143 |
| 3,277,849 | 10/1966 | Talbot | 108/53 UX |

Primary Examiner—Robert B. Reeves
Assistant Examiner—David A. Scherbel
Attorney—Howard T. Keiser et al.

[57] ABSTRACT

A hopper-type pallet which includes a pallet body having downwardly and inwardly sloping walls terminating in a dispensing opening and which includes a plurality of legs to permit the handling thereof by means of fork lift trucks. The pallet is adapted to be used in conjunction with a container body and is particularly suitable for the handling of flowable materials. Additionally, the pallet is of such a construction that one or more of the empty pallets can be nested together in closely spaced relationship to minimize space requirements in the course of shipping or storing the empty pallets.

4 Claims, 8 Drawing Figures

PALLET

BACKGROUND OF THE INVENTION

This invention relates to a pallet for carrying flowable materials and more particularly to a dispensing pallet which will permit the carrying and the subsequent dispensing of flowable materials.

The use of pallets for carrying industrial products by means for fork lift trucks or the like is well-known. Known pallets are generally rectangular platforms of a wooden or plastic construction and permit the articles to be carried to be set thereon and either retained by their own weight or strapped to the pallet to insure that they do not fall therefrom in the course of transporting the article-pallet combination. Pallets of the type just described are frequently used to facilitate the handling and transportation of flowable materials which are generally packaged in sacks made of paper, plastic, cloth, or the like. For example, the standard technique in handling abrasive grains utilized in the manufacture of abrasive grinding wheels involves packaging the grains in paper sacks which are then arranged in a predetermined pattern on a wooden pallet to provide a given weight of abrasive materials. The pallets and their associated sacks of abrasive grains can then be shipped either by airplane, truck, rail car, or ship to their ultimate destination. After reaching their destination, the paper sacks must be individually opened and the abrasive grains dumped into a storage or weighing bin, or into a mixer, after which the grinding wheels are formed from a combination of the abrasive grains and a suitable matrix or binder material which holds the abrasive grains together. The initial packaging of the grains in the paper sacks, their subsequent accumulation on a pallet, their removal therefrom, and the act of individually opening each sack are each time consuming steps which add unnecessarily to the total cost of the resulting grinding wheel.

It is an object of the present invention to obviate the above-described difficulties by providing an improved pallet construction particularly suitable for handling flowable materials in bulk form.

SUMMARY OF THE INVENTION

Briefly stated, in accordance with one aspect of the present invention, a hopper-type pallet is provided which includes a pallet body having a rectangular outline and including a plurality of bottom walls which slope downwardly and inwardly to form the base of a receptacle or container in which the material to be shipped is carried. The pallet body is supported by a plurality of legs to permit the pallet to be handled by standard fork lift trucks. A dispensing opening is provided in the pallet body at a lower portion thereof to permit the material carried by the pallet to be dispensed therefrom. Preferably, the legs of the pallet are hollow and have tapering side walls to permit nesting of one or more of the empty pallets in closely spaced relationship.

DESCRIPTION OF THE PREFERRED EMBODIMENTS

Figure 1:
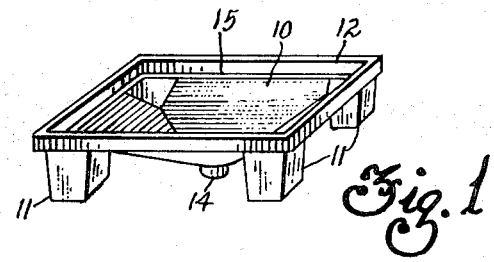
FIG. 1 is a perspective view of the pallet of the present invention.

Referring now to the drawings and particularly to FIG. 1 thereof, there is shown a perspective view of the pallet of the present invention which comprises a pallet body 10 and a plurality of legs 11 which depend from pallet body 10. Pallet body 10 is preferably of rectangular outline and can include an upstanding lip 12, which can slope outwardly, if desired, and which is preferably positioned along the peripheral edges of pallet body 10.

Figure 2:
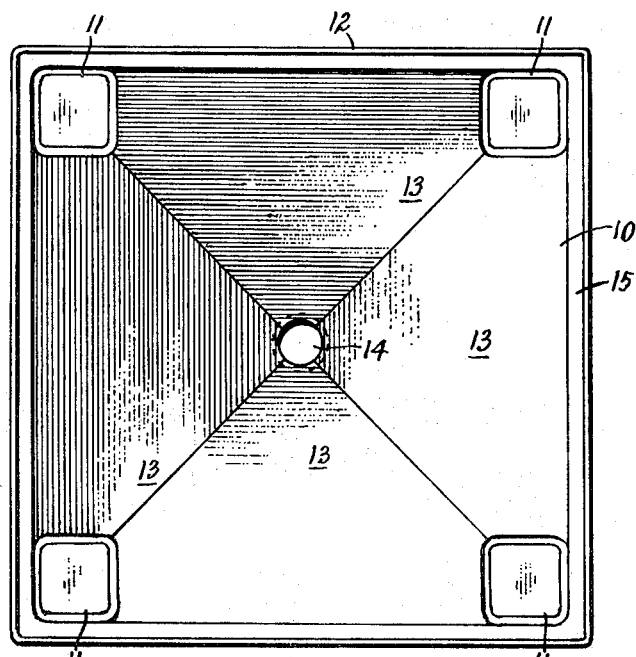
FIG. 2 is a top view of the pallet shown in FIG. 1.

As shown more clearly in FIG. 2, pallet body 10 is formed from a plurality of generally triangular sections 13 which are positioned in abutting relationship. Positioned substantially centrally of pallet body 10 is a dispensing opening 14 to permit the material carried by the pallet to be dispensed therefrom.

Figure 3:
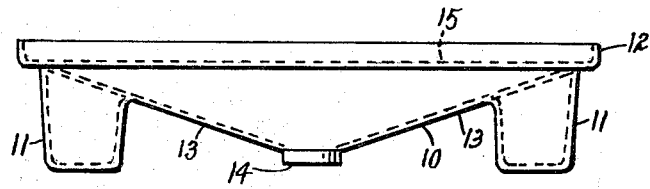
FIG. 3 is a side view of the pallet shown in FIG. 1.

Each of the respective generally triangular sections 13 slopes downwardly and inwardly as shown in FIG. 3 so that the material carried by the pallet is directed by gravity toward dispensing opening 14. Although shown in FIGS. 1, 2, and 3 as having only four sections 13, it would be apparent to those skilled in the art, that pallet body 10 can be formed from any number of individual sections butted together to provide the desired pallet body outline. Additionally, it would also be apparent to those skilled in the art that pallet body 10 could be formed from a continuous curved surface of generally frustoconical configuration (not shown), if desired.

As shown in FIGS. 1, 2, and 3, the pallet can include an outwardly extending planar surface 15 which extends outwardly from the uppermost and outermost edges of generally triangular sections 13 of pallet body 10 and which can define a generally rectangular outline forming, in essence, a base for a shipping container or sidewalls positioned on the pallet as will hereinafter be explained in more detail.

Figure 4:
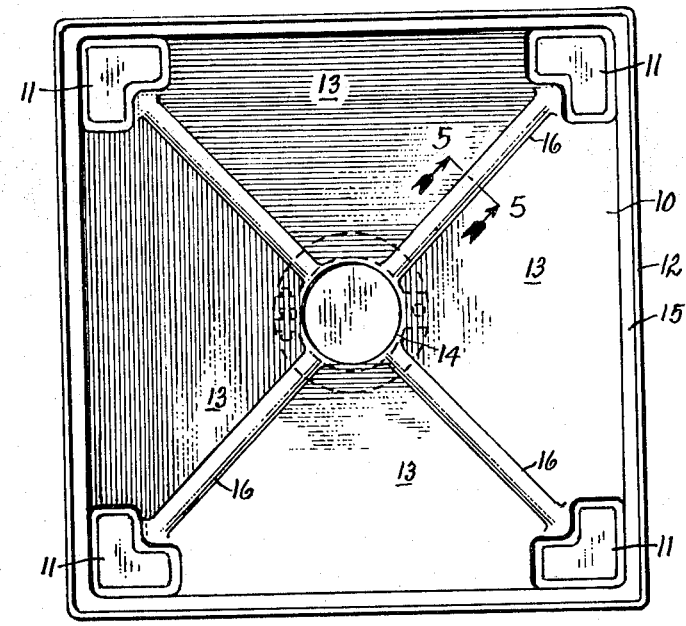
FIG. 4 is a top view of an alternative embodiment which includes diagonal stiffening ribs.
Figure 5:
FIG. 5 is a cross-sectional view taken along the line 5—5 of FIG. 4 and showing the stiffening ribs in cross-section.

If desired, pallet body 10 can be provided with stiffening ribs 16 such as those shown in FIGS. 4 and 5 to increase the strength of the pallet body and permit the use of lighter or more flexible materials to form pallet body 10 to thereby save cost or weight. Additionally, the embodiment of the pallet shown in FIG. 4 also incorporates legs having a larger cross-sectional area, which may be desirable when extremely dense materials are carried by said pallet.

Figure 6:
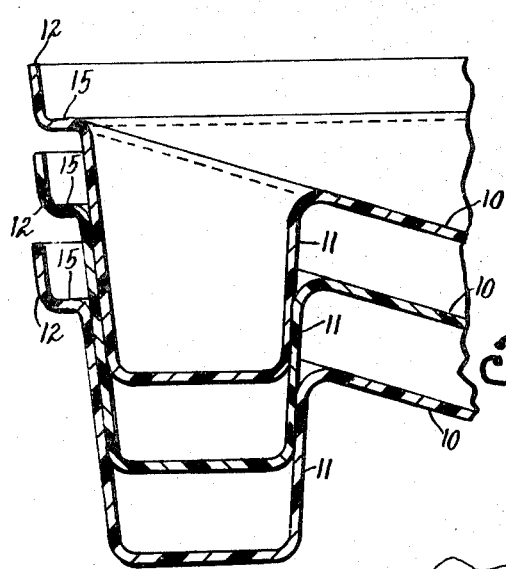
FIG. 6 is a fragmentary cross-sectional view showing one corner of a stack of several pallets which are nested together in closely spaced relationship.

Legs 11 of the pallet are preferably hollow to permit a plurality of the pallets to be stacked one upon the other in closely spaced, nested relationship, as shown in FIG. 6, so as to minimize the amount of space occupied by said pallets while they are being returned for reuse or while they are being stored. Additionally, legs 11 can be so spaced to permit the handling of such pallets by means of fork lift trucks.

The pallet of the present invention is preferably formed as a unitary structure and can be made of formed or drawn sheet metals such as steel, aluminum, and the like, or they can be formed from synthetic plastics materials such as polyethylene, polypropylene, ABS, polycarbonate, or the like by means of injection molding, or alternatively, they can be formed from reinforced plastics such as, for example, fiberglass, by processes well-known to those skilled in the art.

Figure 7:
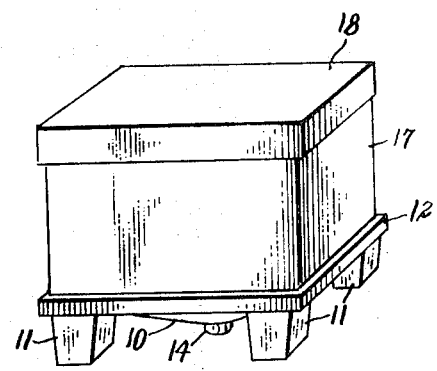
FIG. 7 shows the pallet of the present invention in combination with a container to form a dispensing shipping container.

The pallet of the present invention can be utilized in conjuction with a sidewall 17 and a top closure 18 as shown in FIG. 7. Sidewall 17 can be made from any convenient and suitable materials such as, for example, plain or corrugated paperboard. The use of sidewall 17 will permit the inclusion of additional material in a vertical direction to increase the capacity of the pallet and it can be positioned on outwardly extending planar surface 15 of FIG. 2 if the latter is present, or it can merely rest on the peripheral edge of the pallet body 10 within upstanding lip 12, which provides transverse support for sidewall 17. A suitable top closure 18 can also be applied to the pallet-sidewall combination to close the open top of sidewall 17 to form a closed container and thereby prevent the contamination of its contents by foreign materials. In the form shown in FIG. 7, the pallet can be used for the transportation of powdered, granular, and particulate solid materials, as well as for liquid materials. In the case of the latter, a suitable impervious liner (not shown) in the form of a plastic bag, for example, can be employed to prevent leakage of the liquid from between sidewall 17 and pallet body 10. Examples of the types of dry materials which can be so handled are abrasive grains, flour, sugar, particulate chemicals, ball bearings, nuts, and innumerable other products.

Figure 8:
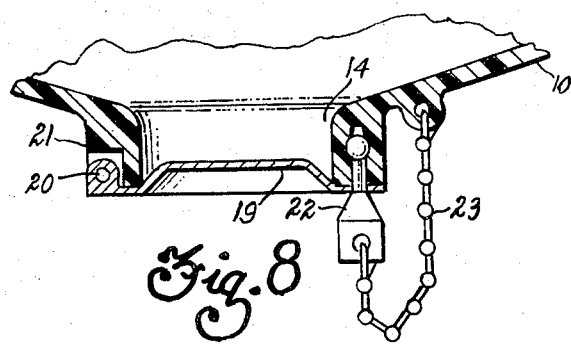
FIG. 8 is a fragmentary cross-sectional view of the dispensing opening showing one form of closure therefor.

In order to permit the dispensing of the materials from the pallet, a suitable closure can be provided. As shown in FIG. 8, one such closure can comprise a cover 19 hingedly connected to pallet body 10 by means of a pin 20 carried in a pair of spaced bosses 21 depending from the lower face of pallet body 10. Cover 19 can include a locking device 22 which can be, for example, a snap fitting plug as shown or it can be a threaded plug (not shown) to guard against inadvertent opening of the closure. A retaining chain 23 can be provided, if desired, to avoid loss of locking device 22. It would be obvious to those skilled in the art that many other forms of closure would be suitable such as, for example, snap-fitting cover plates, threaded closure caps, and the like.

While particular embodiments of the invention have been illustrated and described, it will be apparent to those skilled in the art that various changes and modifications can be made and it is intended to cover in the appended claims all such changes and modifications that are within the scope of this invention.

I claim:

1. A hopper-type pallet for flowable materials which is suitable for handling by means of forklift trucks, said pallet comprising:
   a. a pallet body having a generally rectangular outline and having a plurality of panels forming a bottom wall which slopes downwardly and inwardly;
   b. a dispensing opening extending through said pallet body at a lower portion thereof to permit the flow therefrom of materials carried therein;
   c. a plurality of legs depending from said pallet body and formed integrally therewith, said legs being spaced from each other sufficiently to admit lift truck fork tines and being hollow and having side walls which taper downwardly and inwardly to permit nesting of one or more of said pallets in closely spaced relationship;
   d. a planar surface which extends outwardly from the uppermost edge of said pallet body and which defines a rectangular outline; and
   e. an upstanding wall which extends from the outer edge of said surface.

2. The pallet of claim 1 wherein said upstanding wall slopes upwardly and outwardly.

3. The pallet of claim 1 wherein said pallet body includes a plurality of reinforcing ribs formed therein and which extend substantially from said dispensing opening to said legs.

4. The pallet of claim 1 wherein said pallet body comprises four substantially triangular portions wherein one pair of apices of each triangular portion defines half a corner of said pallet body.

* * * * *